United States Patent
Lin et al.

(10) Patent No.: US 9,214,879 B1
(45) Date of Patent: Dec. 15, 2015

(54) SOFT START DEVICE FOR ELECTRONIC CUTTING MACHINE TOOL

(71) Applicant: DURQ MACHINERY CORP., Taichung (TW)

(72) Inventors: Chien-Chang Lin, Taichung (TW); Chia-Sheng Liu, Taichung (TW)

(73) Assignee: DURQ MACHINERY CORP., Taichung (TW)

( * ) Notice: Subject to any disclaimer, the term of this patent is extended or adjusted under 35 U.S.C. 154(b) by 1 day.

(21) Appl. No.: 14/462,895

(22) Filed: Aug. 19, 2014

(30) Foreign Application Priority Data

May 30, 2014 (TW) .............................. 103119159 A

(51) Int. Cl.
*H02P 7/00* (2006.01)
*H02P 1/04* (2006.01)

(52) U.S. Cl.
CPC ........................................ *H02P 1/04* (2013.01)

(58) Field of Classification Search
CPC .......... B23D 47/12; B23Q 11/04; B25F 5/00; B27B 5/38; H02H 7/122; H02H 9/001; H02P 25/14; H02P 7/295; H05B 39/02; Y10S 323/901; Y10T 83/141; Y10T 83/148; Y10T 83/7697; Y10T 83/7788
USPC ............. 318/244, 246, 430, 432, 779; 363/55
See application file for complete search history.

(56) References Cited

U.S. PATENT DOCUMENTS

| 4,008,416 | A | * | 2/1977 | Nakasone | H05B 39/02 315/194 |
| 4,638,226 | A | * | 1/1987 | Damiano | H02P 25/14 318/246 |
| 5,572,916 | A | * | 11/1996 | Takano | B23D 47/12 83/471.3 |
| 2009/0168470 | A1 | * | 7/2009 | Chen | H02H 7/122 363/55 |
| 2011/0148332 | A1 | * | 6/2011 | Kawano | B25F 5/00 318/244 |

* cited by examiner

*Primary Examiner* — Paul Ip
(74) *Attorney, Agent, or Firm* — Muncy, Geissler, Olds & Lowe, P.C.

(57) ABSTRACT

A soft start device for a power cutting machine tool, a control circuit group includes two end, one of which is connected with an input power source and the other is connected with each of two control switches. When the input power source provides a working voltage for the control circuit group, the control circuit group outputs a low-level signal to the control switches to enable a light emitting circuit group to lighting gradually from dark to light, whereby a resistance of a trigger circuit group decreases gradually to make motor setup the working voltage. Next, the control circuit group outputs a high-level signal after a period of time, to turn on the control switches for inputting voltage to the motor directly. The soft start device can not only decrease the noise during activation of the motor but effectively protect the internal components of an electronic device from damage.

14 Claims, 6 Drawing Sheets

SOFT START DEVICE FOR ELECTRONIC CUTTING MACHINE TOOL

CROSS-REFERENCE TO RELATED APPLICATION

This application claims the benefit of Taiwan Patent Application No. 103119159 filed on May 30, 2014, the disclosure of which is incorporated herein in its entirety by reference.

BACKGROUND OF THE INVENTION

1. Field of the Invention

The present disclosure relates to an activation device, in particular to a soft start device capable of delaying the activation time of a motor of a power tool.

2. Description of the Related Art

As the industry is developed, many manual operations have been gradually replaced by electronic tools. In order to prevent the electronic tool from being impaired by the surge current caused by the activation of the power source, the activation time of the electronic tool is usually designed to be delayed when the electronic tool is activated. If the electronic tool is not installed with a soft start device capable of delaying the activation time, a great surge current will enter the electronic tool as soon as the electronic tool is switched on to make electronic tool generate enormous noise, so the enormous noise may easily frighten the operator or spectators. Besides, a connection interface or internal components of an electronic device are subject to damage resulting from instant entry of the surge current. Thus, what is need is to design a soft start device capable of making the output voltage change gradually.

SUMMARY OF THE INVENTION

To solve the above-mentioned problems, the primary objective of the present disclosure is to provide a soft start device for an electronic cutting machine tool. The soft start device can not only reduce noise, while the motor is activated, but protect internal components of an electronic device effectively.

In order to achieve the above-mentioned objective, the present disclosure provides a soft start device for an electronic cutting machine tool. The machine tool comprises a motor, a cutting unit driven by the motor, and a soft start device connected with the motor. The soft start device comprises a control circuit group, a first control switch, a second control switch, a light emitting circuit group, and a trigger circuit group. The control circuit group comprises a regulator circuit and a control circuit. An input power source is connected to one end of the regulator circuit and the motor, and the other end of the regulator circuit is connected with the control circuit. When the input power source provides a working voltage for the control circuit, the control circuit outputs a low-level signal to the first control switch and a light emitting unit of the light emitting circuit group generates light fading up to make the resistance of a sensing unit of the trigger circuit group decrease gradually and to make the working voltage of the motor increase gradually. After a period of time, the control circuit outputs a high-level signal to the first control switch to turn on the second control switch for inputting the voltage to the motor directly.

Preferably, the control circuit group further comprises a reversing switch circuit connected with the control circuit and the first control switch. While the low-level signal and the high-level signal are transmitted through the reversing switch circuit, the reversing switch circuit provides a high-level signal based on the low-level signal of the control circuit for turning on the light emitting circuit group, or the reversing switch provides a low-level signal based on the high-level signal of the control circuit for turning off the light emitting circuit group.

Preferably, the light emitting circuit group comprises a delay circuit, a Darlington circuit, and the light emitting unit. The delay circuit is connected to the Darlington circuit for delaying the lighting of the light emitting unit for a period of time.

Preferably, the control circuit comprises a control chip, a capacitor, a diode, an electrolytic capacitor, and a resistor. The input power source provides a normal working voltage for the control chip and the electrolytic capacitor. The control chip is connected to the capacitor, the diode, and the resistor.

Preferably, the trigger circuit group comprises an RC circuit, a bidirectional trigger diode, a bidirectional silicon controller, and the sensing unit. The RC circuit is connected to the bidirectional trigger diode. When the resistance of the sensing unit decreases gradually, the voltage of the RC circuit increases gradually to enable the bidirectional trigger diode to reach breakdown for conduction, so that a gate of the bidirectional silicon controller is triggered to make rotation of the motor high speed from low speed.

Preferably, the first control switch is a bidirectional silicon controlled switch.

Preferably, the second control switch is a relay.

Therefore, the soft start device of the present disclosure provides a light signal indicative of fading up for the sensing unit of the trigger circuit group via the light emitting unit of the light emitting circuit group to make the resistance of the sensing unit decrease gradually and to make rotation of the motor reach high speed from low speed, so that the noise generated during the activation of the motor can be decreased and the internal components of the electronic device are protected efficiently from being damaged.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

DETAILED DESCRIPTION OF THE PREFERRED EMBODIMENTS

Figure 1:
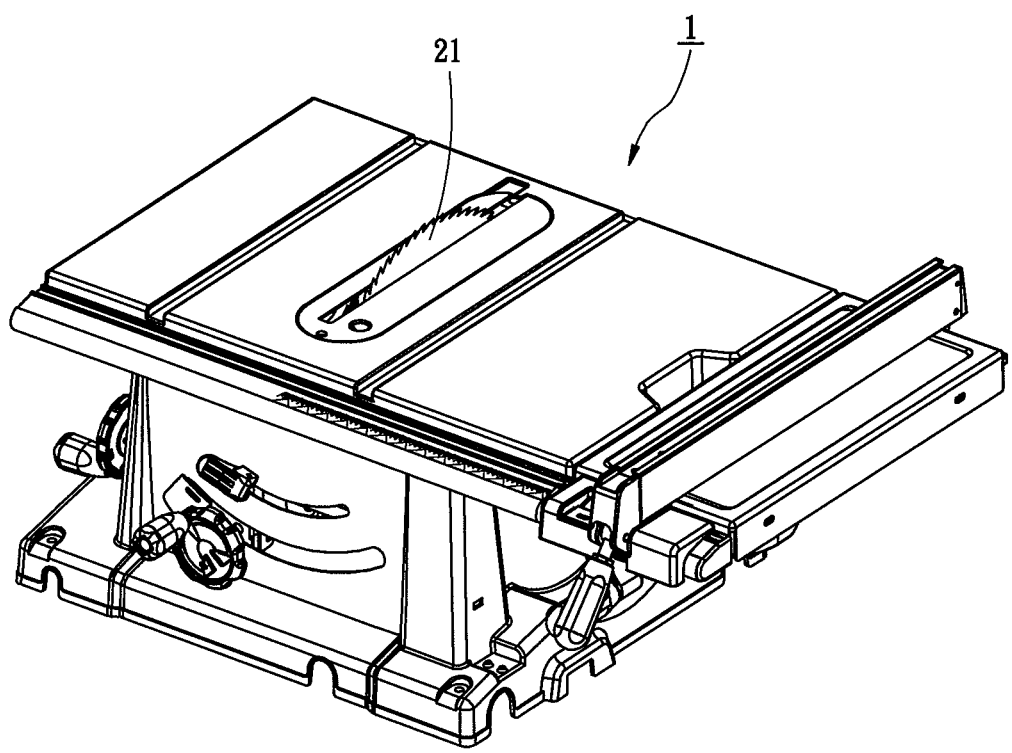
FIG. 1 illustrates an electronic cutting machine tool to which the soft start device applied.
Figure 2:
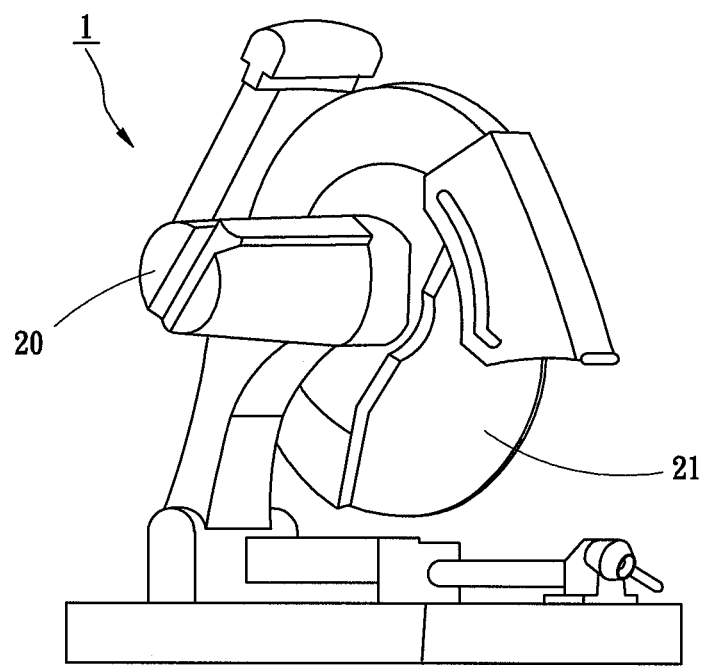
FIG. 2 illustrates an electronic cutting machine tool to which the soft start device applied.
Figure 3:
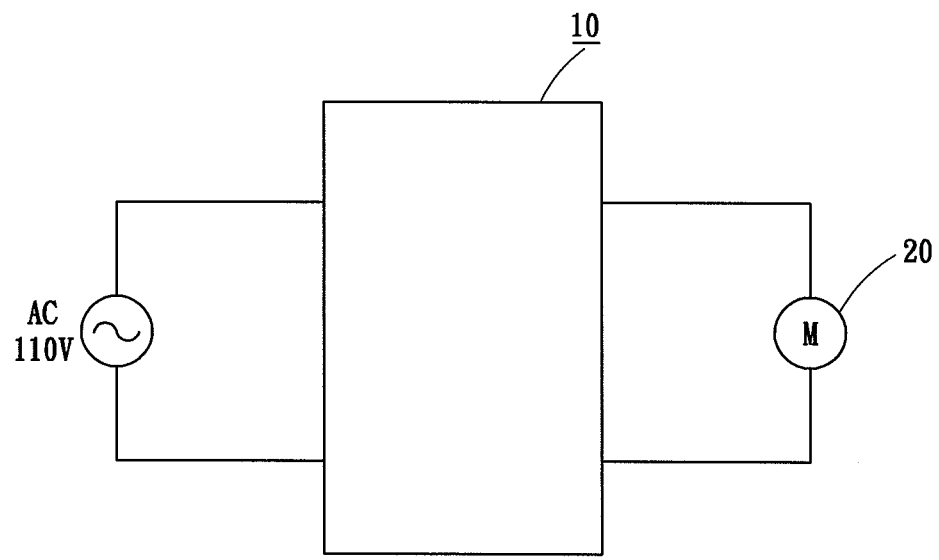
FIG. 3 is a rough circuit diagram of the soft start device for the electronic cutting machine tool of the present disclosure.
Figure 4:
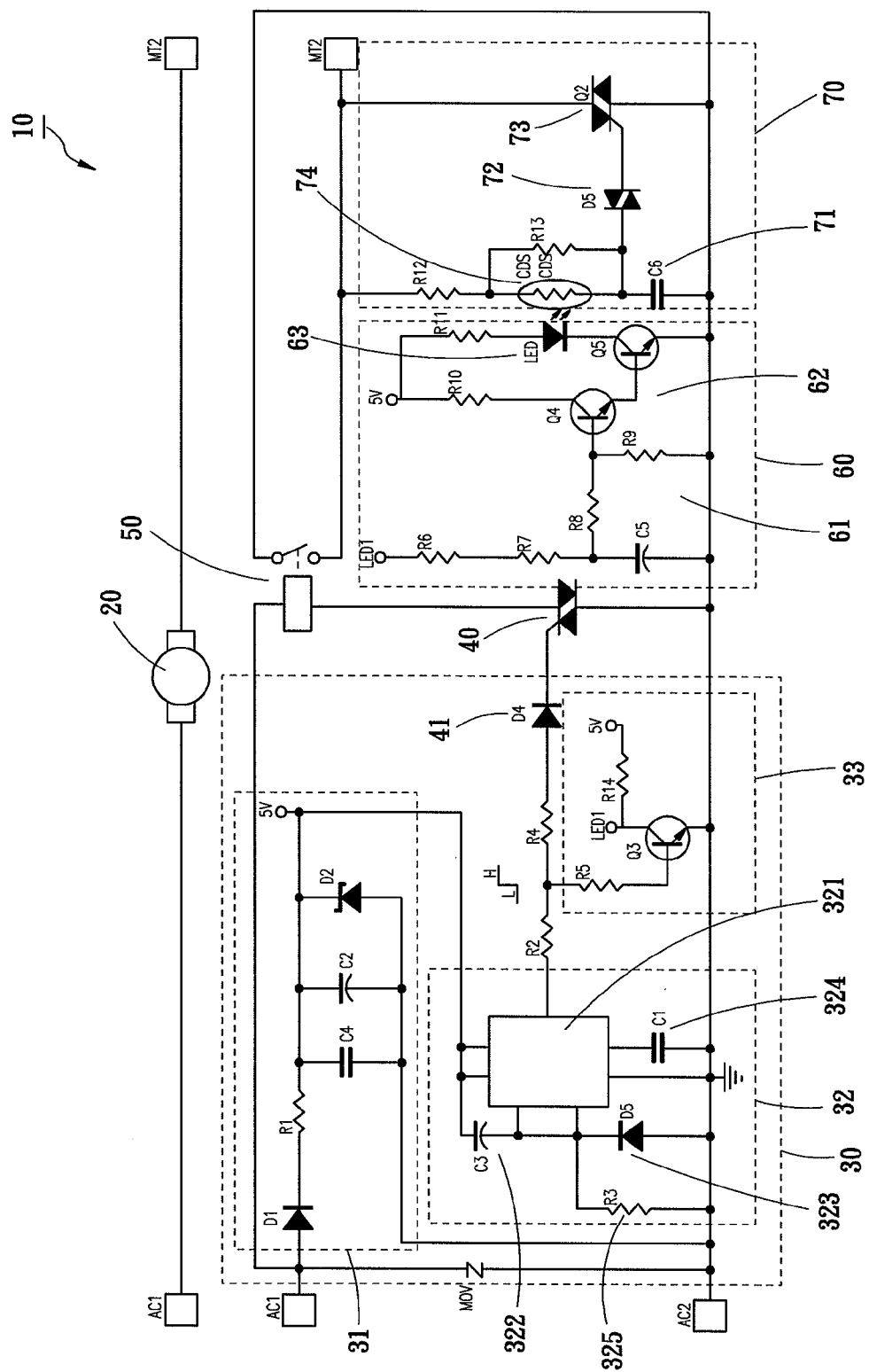
FIG. 4 is a detailed circuit diagram of the soft start device applied to the electronic cutting machine tool of the present disclosure in accordance with a first preferred embodiment.

Reference will now be made in detail to the preferred embodiments of the present disclosure, examples of which are illustrated in the accompanying drawings. Wherever possible, the same reference numbers are used in the drawings and the description to refer to the same or like parts.

Referring to FIGS. 1-4, a first preferred embodiment of the present disclosure provides a soft start device 10 for an electronic cutting machine tool 1. The machine tool 1 has a motor 20, a cutting unit 21 driven by the motor 20, and the soft start device 10 connected with the motor 20. The machine tool 1 described in this preferred embodiment can be but not limited to a table sawing machine or a circular sawing machine, and the cutting unit 21 can be but not limited to a circular saw piece. The soft start device 10 of the present in disclosure mainly comprises a control circuit group 30, a first control switch 40, a second control switch 50, a light emitting circuit group 60, and a trigger circuit group 70. The control circuit group 30 comprises a regulator circuit 31, a control circuit 32, and a reversing switch circuit 33. The control circuit 32 comprises a control chip 321, a capacitor 322, a diode 323, an electrolytic capacitor 324, and a resistor 325. The control chip 321 is connected to the capacitor 322, the electrolytic capacitor 324, the diode 323, and the resistor 325. An input power source provides a working voltage for the regulator circuit 31 and the motor 20. The regulator circuit 31 is connected to the control chip 321 and the capacitor 322. The reversing switch circuit 33 is connected to the control chip 321 of the control circuit 30 and connected to the first control switch 40 via a diode 41, for providing a reverse signal for the light emitting circuit group 60. The light emitting circuit group 60 comprises a delay circuit 61, a Darlington circuit 62, and a light emitting unit 63. The delay circuit 61 is connected to the Darlington circuit 62 for delaying the lighting of the light emitting unit 63 for a period of time. The trigger circuit group 70 comprises an RC circuit 71, a bidirectional trigger diode 72, a bidirectional silicon controller 73, and a sensing unit 74. The RC circuit 71 is connected to the bidirectional trigger diode 72. When the resistance of the sensing unit 74 decreases gradually, the voltage of the RC circuit 71 increases gradually to enable the bidirectional trigger diode 72 to trigger the bidirectional silicon controller 73, and the turned-on angle of the bidirectional silicon controller 73 becomes larger and larger, so the working voltage of the motor 20 increases gradually and the rotating speed of the motor 20 become higher correspondingly.

Figure 5:
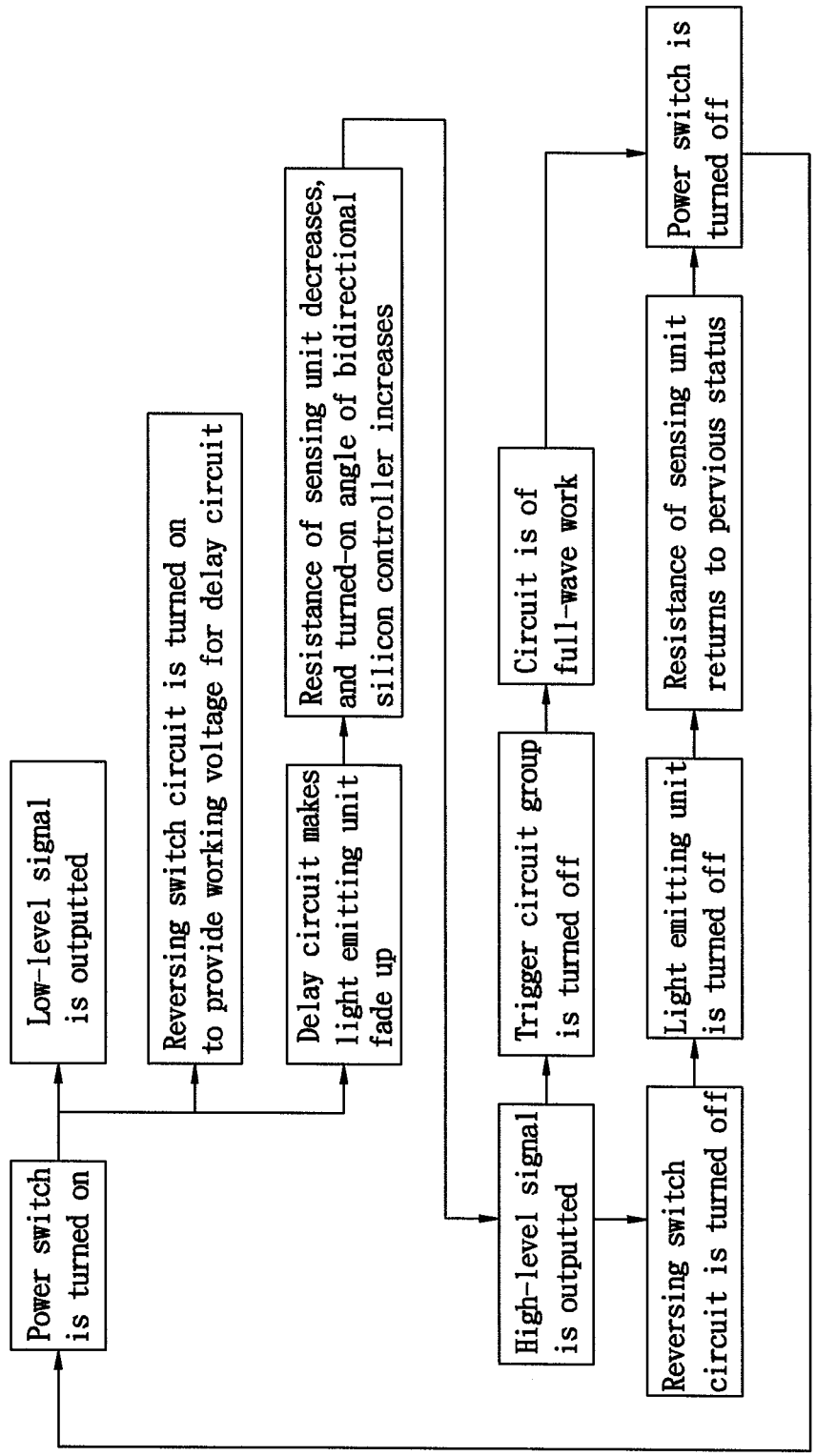
FIG. 5 is a block diagram of the soft start device applied to the electronic cutting machine tool of the present disclosure in accordance with the first preferred embodiment.

Please refer to FIG. 5. After the power source switch is turned on, when the input power source provides the working voltage for the control circuit 32 the control circuit 32 outputs a low-level signal L1 to the reversing switch circuit 33 and then the low-level signal L1 passes through to reach the first control switch 40 via the diode 41. Because the low-level signal L1 is insufficient to make the first control switch 40 turn on the second control switch 50, the second control switch 50 and the motor 20 are turned-off. The reversing switch circuit 33 provides a high-level signal H2 for a delay circuit 61 of the delay circuit group 60 according to the low-level signal L1 of the control circuit 30, so the light emitting unit 63 of the light emitting circuit group 60 generates light fading up to gradually lower the resistance of the sensing unit 74 of the trigger circuit group 70 and to steadily heighten the working voltage of the motor 20 increases steadily. In the meantime, the rotating speed of the motor 20 increases gradually to become higher and higher as the working voltage increases gradually. Next, the control circuit 32 outputs a high-level signal H1 to the reversing switch circuit 33 and the first control switch 40 after a period of time, the second control switch 50 is switched to be turned on with the motor 20 directly by the first control switch 40. The high-level signal H1 of the control circuit group 30 is converted into a low-level signal L2 through the reversing switch circuit 33, and the low-level signal L2 is provided for the light emitting circuit group 60, so the light emitting circuit group 60 and the trigger circuit group 70 stop operation. In addition, the trigger circuit group 70 also stops operation due to the increased resistance of the sensing unit 74, and meanwhile, the voltage is directly inputted to the motor 20 via the second control switch 50, and the motor 20 does not stop operation until a power switch is turned off. In this preferred embodiment of the present disclosure, the first control switch 40 is a bidirectional silicon controlled switch, the second control switch 50 is a relay, the light emitting unit 63 is a light emitting diode, and the sensing unit 74 is a photosensitive resistor.

Figure 6:
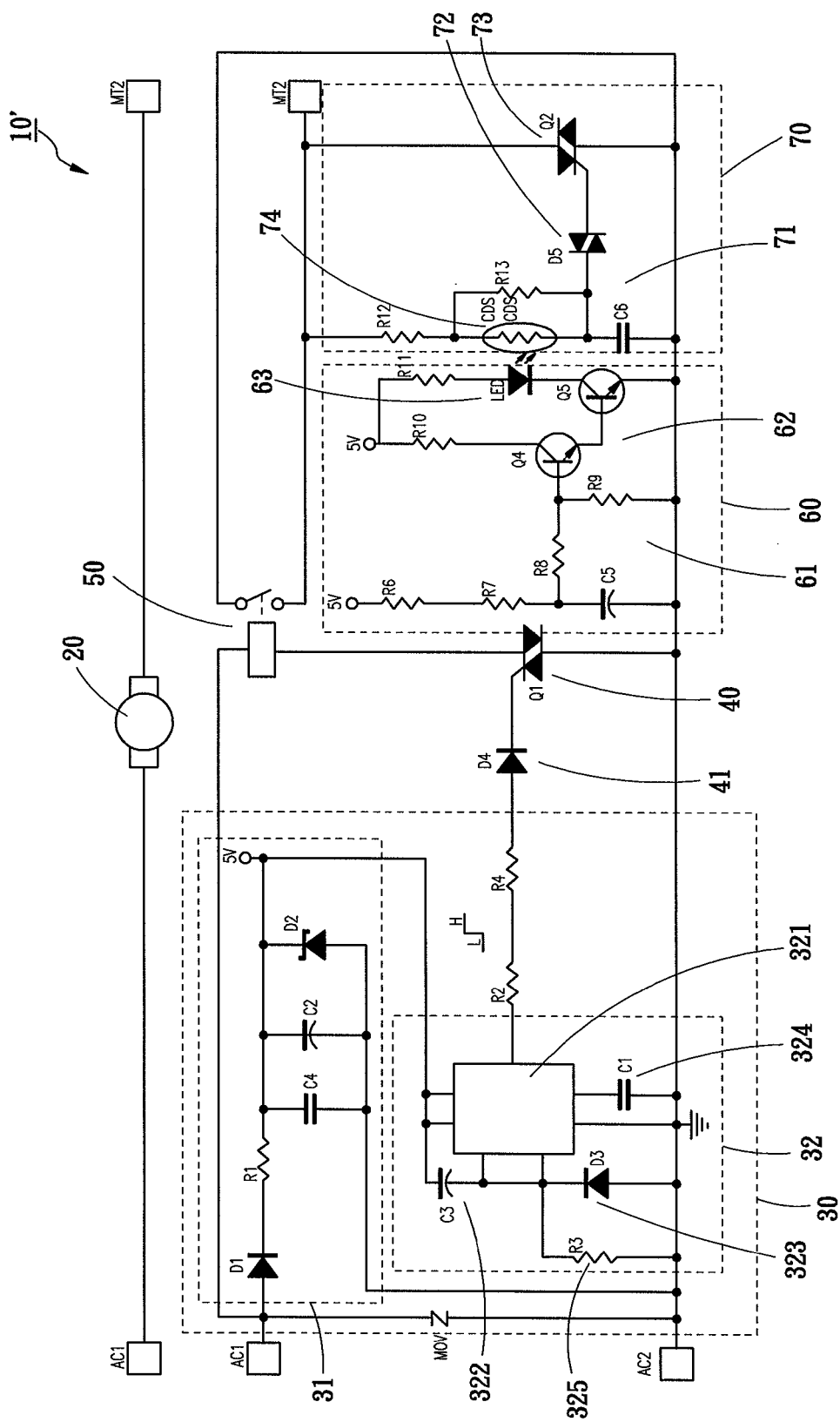
FIG. 6 is a detailed circuit diagram of the soft start device applied to the electronic cutting machine tool of the present disclosure in accordance with a second preferred embodiment.
Figure 7:
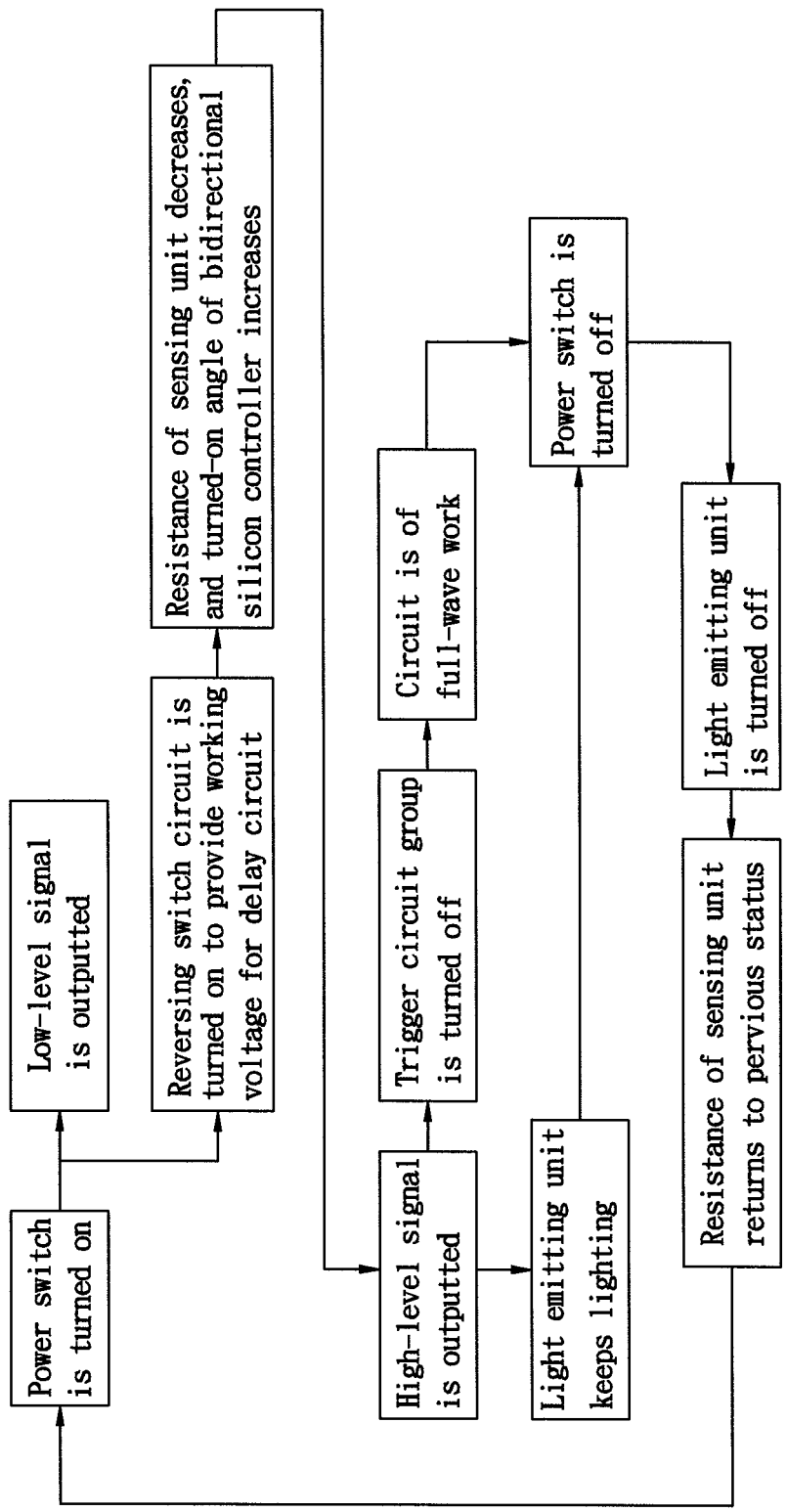
FIG. 7 is a block diagram of the soft start device applied to the electronic cutting machine tool of the present disclosure in accordance with the second preferred embodiment.

Please refer to FIGS. 6-7. A second preferred embodiment of the present disclosure provides a soft start device 10' for the electronic cutting machine tool 1. The soft start device 10' mainly comprises the control circuit group 30, the first control switch 40, the second control switch 50, the light emitting circuit group 60 and the trigger circuit group 70. The circuits of the second preferred embodiment are similar to those of the first preferred embodiment, having the following difference. The control circuit group 30 of the second preferred embodiment only comprises the regulator circuit 31 and the control circuit 32 other than the reversing switch circuit 33 of the first preferred embodiment, so the descriptions of the same parts are omitted and only the difference is recited in following paragraph.

The input power source is connected to one end of the regulator circuit 31 and the motor 20. The other end of the regulator circuit 31 is connected to the control circuit 32. After the power switch is turned on, the input power source provides the working voltage for the control circuit 32 and the control circuit 32 outputs the low-level signal L1 to the first control switch 40 for linking-up with the second control switch 50. However, the low-level signal L1 is insufficient to make the second control switch 50 switched on, so the second control switch 50 and the motor 20 become turned-off. The light emitting unit 63 of the light emitting circuit group 60 generates light fading up as the power switch is turned on, so that the resistance of the sensing unit 74 of the trigger circuit group 70 decreases gradually and the working voltage of the motor 20 starts to increase gradually and steadily. In the meantime, the rotating speed of the motor 20 becomes higher as the working voltage increases and after a period of time, the control circuit 32 outputs the high-level signal H1 to the first control switch 40 to enable the first control switch 40 to make the second control switch 50 switched on with the motor 20 directly, so the voltage can be inputted to the motor 20 directly via the second control switch 50 and meanwhile, the motor 20 can keep operation. It is worth mentioning that the difference between the trigger circuit groups 70 of the first preferred embodiment and the second preferred embodiment lies in that the trigger circuit group 70 of the second preferred embodiment is not turned on or turned off by the low-level signal L1 or the high-level signal H1 outputted from the control circuit 32. However, the trigger circuit group 70 of the second preferred embodiment can be turned on or turned off directly by the power switch.

In conclusion, the soft start devices 10 and 10' of the present disclosure provide the light fading up for the sensing unit 74 of the trigger circuit group 70 through the light emitting unit 63 of the light emitting circuit group 60, so the resistance of the sensing unit 74 decreases gradually to make the motor 20 have steady working voltage. In this way, the noise generated during the activation of the motor can be decreased and the internal components of the electronic device can be protected effectively.

The above-mentioned descriptions represent merely the preferred embodiments of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A soft start device applied to an electronic cutting machine tool, the machine tool having a motor, a cutting unit driven by the motor, and the soft start device connected with the motor, and the soft start device comprising a control circuit group, a first control switch, a second control switch, a light emitting circuit group, and a trigger circuit group;
   wherein the control circuit group comprises a regulator circuit and a control circuit, an input power source being connected to an end of the regulator circuit and the motor, the other end of the regulator circuit being connected to the control circuit; when the input power source provides a working voltage for the control circuit, the control circuit outputs a low-level signal to the first control switch, a light emitting unit of the light emitting circuit group generates light fading up for gradually decreasing a resistance of a sensing unit of the trigger circuit group to make the working voltage of the motor increase gradually and make the second control switch turned-off; after a period of time, the control circuit outputs a high-level signal to the first control switch to make the second control switch turned on for inputting the voltage to the motor directly.

2. The soft start device as defined in claim 1, wherein the control circuit group further comprises a reversing switch circuit connected to the control circuit and the first control switch, and when the low-level signal and the low-level signal pass through the reversing switch circuit, the reversing switch circuit provides the high-level signal based on the low-level signal of the control circuit to turn on the light emitting circuit group or the reversing switch provides the low-level signal based on the high-level signal of the control circuit to turn off the light emitting circuit group.

3. The soft start device as defined in claim 2, wherein the light emitting circuit group comprises a delay circuit, a Darlington circuit, and the light emitting unit, the delay circuit being connected to the Darlington circuit for delaying the lighting of the light emitting unit for a period of time.

4. The soft start device as defined in claim 2, wherein the control circuit comprises a control chip, a capacitor, a diode, an electrolytic capacitor, and a resistor, the input power source providing a normal working voltage for the control chip and the electrolytic capacitor, the control chip being connected to the capacitor, the diode, and the resistor, respectively.

5. The soft start device as defined in claim 2, wherein the trigger circuit group comprises an RC circuit, a bidirectional trigger diode, a bidirectional silicon controller, and the sensing unit, the RC circuit being connected to the bidirectional trigger diode; when the resistance of the sensing unit decreases gradually, the voltage of the RC circuit increases gradually to enable the bidirectional trigger diode to trigger a gate of the bidirectional silicon controller.

6. The soft start device as defined in claim 2, wherein the first control switch is a bidirectional silicon controlled switch.

7. The soft start device as defined in claim 2, wherein the second control switch is a relay.

8. The soft start device as defined in claim 1, wherein the light emitting circuit group comprises a delay circuit, a Darlington circuit, and the light emitting unit, the delay circuit being connected to the Darlington circuit for delaying the lighting of the light emitting unit for a period of time.

9. The soft start device as defined in claim 1, wherein the control circuit comprises a control chip, a capacitor, a diode, an electrolytic capacitor, and a resistor, the input power source providing a normal working voltage for the control chip and the electrolytic capacitor, the control chip being connected to the capacitor, the diode, and the resistor, respectively.

10. The soft start device as defined in claim 1, wherein the trigger circuit group comprises an RC circuit, a bidirectional trigger diode, a bidirectional silicon controller, and the sensing unit, the RC circuit being connected to the bidirectional trigger diode; when the resistance of the sensing unit decreases gradually, the voltage of the RC circuit increases gradually to enable the bidirectional trigger diode to trigger a gate of the bidirectional silicon controller.

11. The soft start device as defined in claim 1, wherein the first control switch is a bidirectional silicon controlled switch.

12. The soft start device as defined in claim 1, wherein the second control switch is a relay.

13. The soft start device as defined in claim 1, wherein the light emitting unit of the light emitting circuit group is a light emitting diode.

14. The soft start device as defined in claim 1, wherein the sensing unit of the trigger circuit group is a photosensitive resistor.

* * * * *